United States Patent [19]

Akimoto

[11] Patent Number: 5,729,268
[45] Date of Patent: Mar. 17, 1998

[54] PRINTING APPARATUS AND METHOD OF CONTROLLING THE SAME

[75] Inventor: Koichiro Akimoto, Fujisawa, Japan

[73] Assignee: Canon Kabushiki Kaisha, Tokyo, Japan

[21] Appl. No.: 16,459

[22] Filed: Feb. 11, 1993

[30] Foreign Application Priority Data

Feb. 14, 1992 [JP] Japan .................................. 4-028486
Jan. 29, 1993 [JP] Japan .................................. 5-013549

[51] Int. Cl.$^6$ ........................... B41J 2/385; G03G 15/01; G01D 15/06; H04N 1/21
[52] U.S. Cl. ........................ 347/119; 358/296; 358/437; 364/132; 364/131; 395/182.08; 395/182.03; 395/182.22
[58] Field of Search ..................... 355/515, 518, 355/524, 116, 131; 358/456, 296, 300, 302, 404, 444, 437; 346/12, 46, 51, 45; 342/119; 395/182.08, 182.02, 182.03, 182.1, 182.15, 182.12, 182.22, 182.06; 364/132, 131

[56] References Cited

U.S. PATENT DOCUMENTS 4,855,767  8/1989  Sato et al. .................................. 347/224
5,055,886  10/1991  Nakatani et al. ........................ 347/119

FOREIGN PATENT DOCUMENTS 0468406  1/1992  European Pat. Off. ....... G03G 15/01
0469282  2/1992  European Pat. Off. ....... G03G 15/01

*Primary Examiner*—Benjamin R. Fuller
*Assistant Examiner*—Raquel Yvette Gordon
*Attorney, Agent, or Firm*—Fitzpatrick, Cella, Harper & Scinto

[57] ABSTRACT

A printing apparatus for superposing and recording images of respective recording color components constituting one page on a predetermined recording medium to form a color image includes an operation unit for instructing to stop printing processing, an output section for converting input printing data into pattern images of the respective color components and storing the pattern images in an image buffer memory, a printer engine for superposing and recording the pattern images converted by the output section on the recording medium in units of recording color components, and an instruction section for controlling to stop processing upon completion of current color component superposition recording when at least a printing stop instruction is output from the operation unit while sequential superposition recording of the images of the respective color components is being performed by the printer engine.

6 Claims, 4 Drawing Sheets

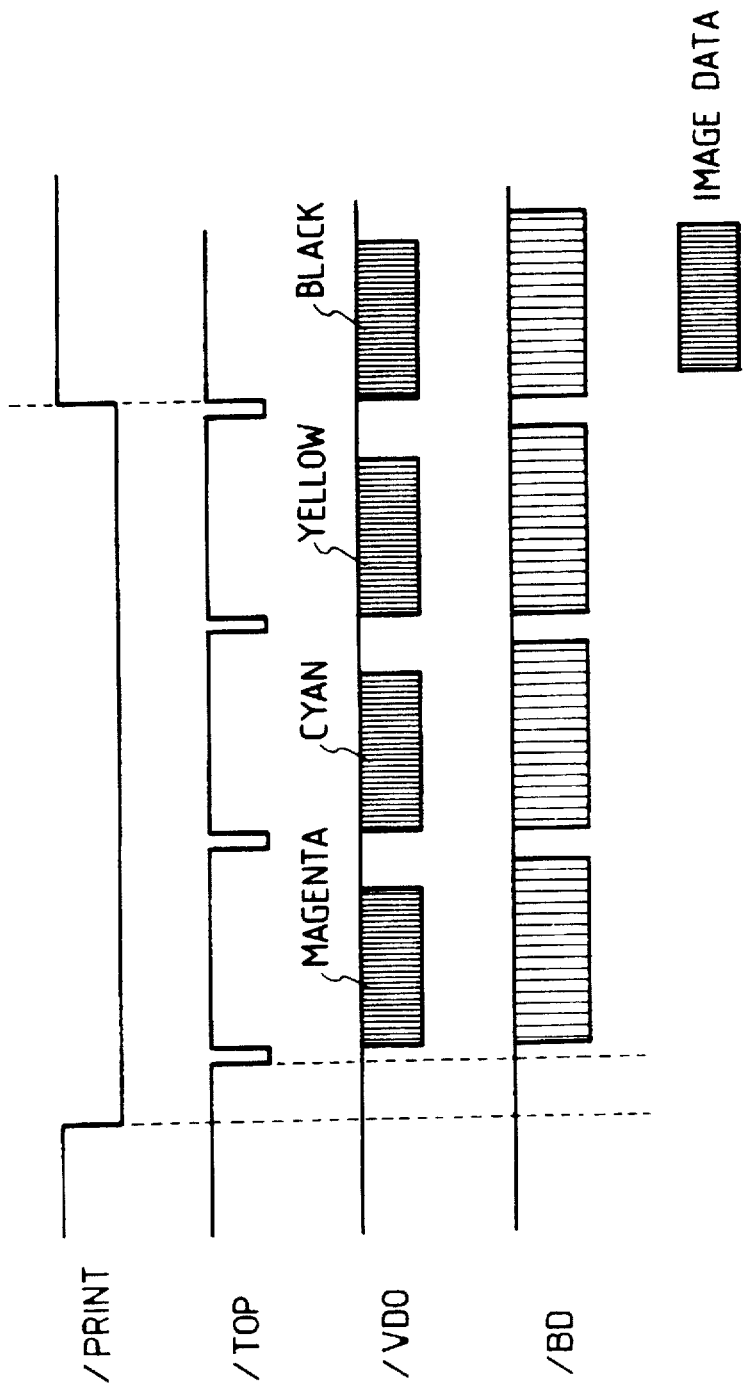

1

PRINTING APPARATUS AND METHOD OF CONTROLLING THE SAME

BACKGROUND OF THE INVENTION

1. Field of the Invention

The present invention relates to a printing apparatus and, more particularly, to a printing apparatus for recording and outputting an image based on input printing data on a predetermined recording medium.

2. Related Background Art

In a conventional color printing apparatus, color data is analyzed and converted into basic colors (e.g., yellow (Y), magenta (M), cyan (C), and black (Bk)), and the basic color data are stored in a development memory. Transfer of one-page basic color data from the development memory to a printer engine is started (e.g., in an order of Y, M, C, and Bk), and at the same time, a paper sheet as a recording medium is fed. The paper sheet is wound around a transfer drum inside the printer. An image of one basic color is transferred to the paper sheet upon one revolution of the transfer drum, and image transfer of one page is completed by four revolutions of the transfer drum. When printing processing is to be stopped during the transfer, it can be stopped only after transfer processing of one page is completed.

In the conventional example, even if printing is to be stopped during transfer of one page, all the data of the basic colors must be transferred. For this reason, it takes much time to shift control to processing of the next page. For example, when an instruction for stopping printing is generated during printing of the first basic color, the operation is stopped only after about 30 seconds.

SUMMARY OF THE INVENTION

It is an object of the present invention to provide a printing apparatus for superposing and recording images of respective recording color components constituting one page on a predetermined recording medium to form a color image, comprising:

instruction means for instructing to stop printing processing;

developing means for converting input printing data into pattern images of the respective color components and storing the pattern images in a development memory;

recording means for superposing and recording the pattern images converted by the developing means on the recording medium in units of recording color components; and control means for controlling to stop processing upon completion of a current color component superposition recording when at least a printing stop instruction is output from the instruction means while sequential superposition recording of the images of the respective color components is being performed by the recording means.

It is another object of the present invention to provide a method of controlling a printing apparatus for superposing and recording images of respective recording color components constituting one page on a predetermined recording medium to form a color image, comprising the steps of:

converting input printing data into pattern images of respective color components and storing the pattern images in corresponding recording color component memories;

performing superposition recording of the pattern images on the recording medium in units of recording color components; and controlling to stop processing upon completion of current color component superposition recording when at least a printing stop instruction is output during the recording.

It is still another object of the present invention to provide a printing apparatus capable of shortening a time required until printing processing is actually stopped and next printing processing can be performed after a printing stop instruction is output during superposition recording of a plurality of images.

It is still another object of the present invention to provide a printing apparatus for superposing and recording a plurality of images on a predetermined recording medium in units of pages, comprising:

instruction means for instructing to stop printing processing;

memories corresponding to the number of images to be synthesized; and control means for controlling to stop processing upon completion of current image recording when a printing stop instruction is output from the instruction means while superposition recording of the images stored in the memories is being performed in units of memories.

It is still another object of the present invention to provide a printing apparatus capable of omitting recording processing of remaining color components when a printing stop instruction is output during superposition recording of images of respective color components.

BRIEF DESCRIPTION OF THE DRAWINGS

FIG. 4 is a waveform chart of input and output signals at a printer I/F 108 of this embodiment.

DESCRIPTION OF THE PREFERRED EMBODIMENTS

A preferred embodiment of the present invention will be described in detail with reference to the accompanying drawings. This embodiment exemplifies a laser beam printer.

[Description of Printer Engine]

Figure 3:
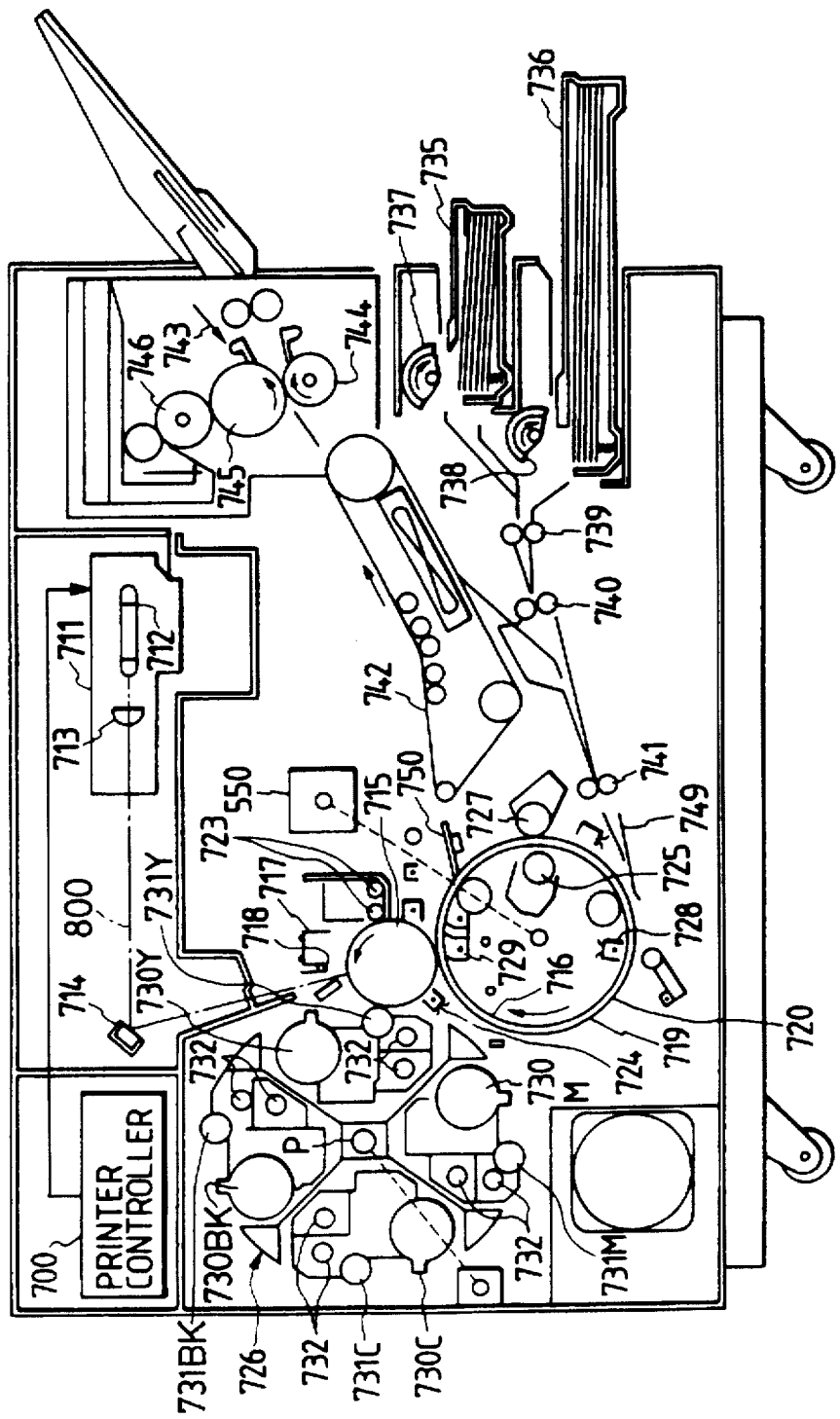
FIG. 3 is a view showing the structure of a printer engine of this embodiment.

FIG. 3 is a sectional view of a printer engine of a color laser beam printer of this embodiment.

The color laser beam printer includes a printer controller 700 for receiving printing data, outputting a video signal consisting of the respective color components, and controlling the overall apparatus. The respective components of the color laser beam printer will be sequentially described below.

A scanner 711 includes a laser output unit (not shown) such as a semiconductor laser element for converting an image signal from the printer controller 700 to an optical signal, a polygonal mirror 712 consisting of a polyhedron (e.g., octahedron), a motor (not shown) for rotating the mirror 712, and an f/θ lens (condenser lens) 713. The color laser beam printer also includes a reflecting mirror 714 for changing the optical path of the laser beam, and a photosensitive drum 715.

A laser beam emitted from the laser output unit is reflected by one side surface of the polygonal mirror 712 and is transmitted through the f/θ lens 713 and the mirror 714. The laser beam then linearly scans (raster-scans) the surface of the photosensitive drum 715 rotated in a direction indicated by an arrow in FIG. 3. Therefore, a two-dimensional latent image corresponding to an original image is formed on the surface of the photosensitive drum 715.

The color laser beam printer also includes a primary charger 717, a whole surface exposure lamp 718, a cleaner 723 for recovering residual toner which cannot be transferred to the recording medium, and a transfer precharger 724. These components are arranged around the photosensitive drum 715.

A developer unit 726 develops a latent image formed on the surface of the photosensitive drum 715 upon laser exposure and has the following arrangement. Developing sleeves 731Y, 731M, 731C, and 731Bk are brought into direct contact with the photosensitive drum 715 to perform development. Toner hoppers 730Y, 730M, 730C, and 730Bk store supplementary toners. Screws 732 supply the corresponding developing agents. The developing sleeve assemblies constituted by the sleeves 731Y to 731Bk, the toner hoppers 730Y to 730Bk, and the screws 732 are arranged around a rotating shaft P of the developer unit. Note that symbols Y, M, C, and Bk denote colors, respectively. That is, "Y" represents yellow; "M", magenta; "C", cyan; and "Bk", black. To form a yellow toner image, yellow toner developing processing is performed at the illustrated position. To form a magenta toner image, the developer unit 726 is rotated about the shaft P in FIG. 3 to bring the developing sleeve 731M in the magenta developer into contact with the photosensitive drum 715. Similar operations are performed in development of cyan and black components.

A transfer drum 716 transfers the toner image formed on the photosensitive drum 715 to a paper sheet. An actuator plate 719 detects the moving position of the transfer drum 716. A position sensor 720 in the vicinity of the actuator plate 719 detects that the transfer drum 716 reaches the home position. The color laser beam printer further includes a transfer drum cleaner 725, a paper press roller 727, a discharger 728, and a transfer charger 729. The actuator plate 719, the position sensor 720, the transfer drum cleaner 725, the paper press roller 727, and the transfer charger 729 are arranged around the transfer roller 716.

Paper cassettes 735 and 736 store paper sheets. In this embodiments, for example, A4-size paper sheets are stored in the paper cassette 735, and A3-size paper sheets are stored in the paper cassette 736. Paper pickup rollers 737 and 738 pick up the corresponding paper sheets from the paper cassettes 735 and 736. Timing rollers 739, 740, and 741 adjust the paper feed and convey timings. A paper sheet fed and conveyed through the timing rollers 739, 740, and 741 is guided to a paper guide 749 and is wound around the transfer drum 716 while the leading end of the paper sheet is held by grippers (to be described later), and the image formation process is then performed. Note that the paper cassette 735 or 736 is selected by an instruction from a main controller (not shown), so that only the selected paper pickup roller is rotated.

A drum rotation motor 550 synchronously rotates the photosensitive drum 715 and the transfer drum 716. Separation grippers 750 separate the paper sheet, electrostatically attracted on the surface of the transfer drum 716, from the transfer drum 716 upon completion of the image formation process. A conveyor belt 742 conveys the separated paper sheet. An image fixing unit 743 fixes the image on the paper sheet conveyed through the conveyor belt 742. The image fixing unit 743 comprises a pair of heat press rollers 744 and 745.

A sheet conveyed from the corresponding paper cassette in the above arrangement is wound around the transfer drum 716. Every time developing processing of one color component is performed, the developed image is transferred to the paper sheet wound around the transfer drum 716. When development and transfer processing of four color components are completed, the paper sheet is separated from the transfer drum 716, conveyed along the conveyor belt 742, fixed by the image fixing unit 743, and discharged outside.

[Description of Printer Controller]

Figure 1:
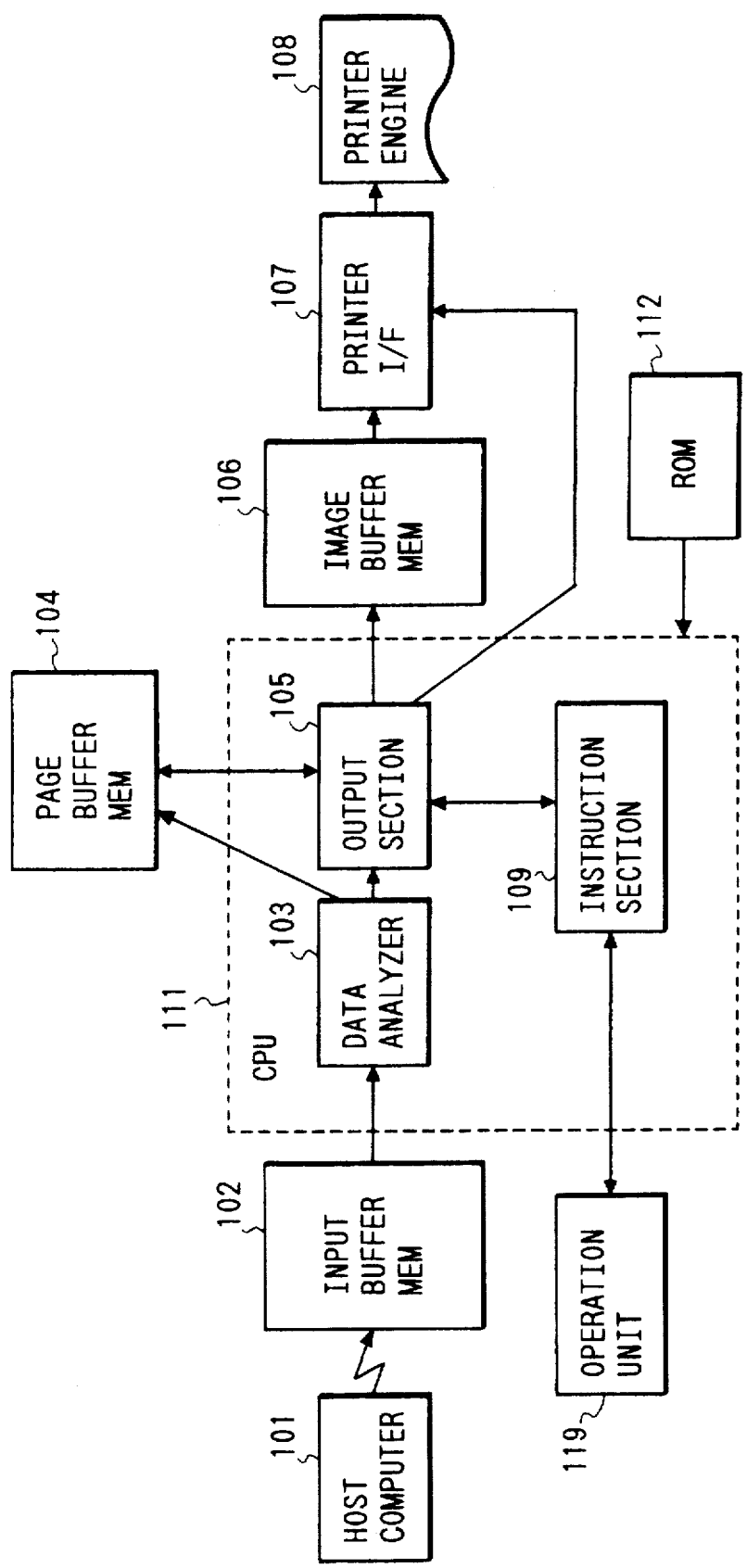
FIG. 1 is a schematic block diagram showing the arrangement of a printer according to an embodiment of the present invention.

FIG. 1 is a block diagram of the printer controller 700 of this embodiment. Referring to FIG. 1, a host computer 101 outputs printing data. The host computer 101 supplies, to the printer, color printing data (printing information) including at least a character code and a control code for performing editing or output control of this character code. An input buffer memory 102 receives and temporarily stores the printing data supplied from the host computer 101. A data analyzer 103 receives the color printing data stored in the input buffer memory 102 and analyzes it. A page buffer memory 104 stores, in units of pages, the color printing data analyzed by the data analyzer 103. An output section 105 converts the color printing data in the page buffer memory 104 into patterns corresponding to the basic color units and outputs the patterns. At the same time, the output section 105 outputs an image data transfer stop instruction from an instruction section 109 to a printer I/F 107. An image buffer memory 106 stores the printing pattern data converted in units of basic colors (yellow Y, magenta M, cyan C, and black Bk). The printer I/F 107 transfers the pattern information from the image buffer memory 106 to a printer engine 108, and at the same time outputs the transfer stop instruction to the printer engine 108. The printer engine 108 is a printer unit for performing color printing according to an electrophotographic scheme as described above. An operation unit 119 can input a transfer stop instruction outside the printing apparatus. Note that the data analyzer 103, the instruction section 109, and the output section 105 are constituted by a CPU 111. Control programs to be executed by the CPU 111 on the basis of a flow chart in FIG. 2 (to be described later) are stored in a ROM 112.

A general operation of the arrangement described above will be described below.

When the color printing data generated by the host computer 101 is supplied to the input buffer memory 102, the data analyzer 103 analyzes the color printing data from the buffer memory 102 and supplies information in units of pages to the page buffer memory 104. When one-page data analysis and formation of page information are completed, the readout operation of the data stored in the page buffer memory 104 is started under the control of the output section 105. The readout data are converted into patterns in the recording color component memories in the image buffer memory 106. When one-page pattern conversion and storage are completed, the recording color components Y, M, C, and Bk in the image buffer memory 106 are output to the printer engine 108 through the printer 10 I/F 107 as a video signal in an order of M, C, Y, and Bk.

When a transfer stop instruction is supplied from the instruction section 109 to the output section 105 during video signal transfer of, e.g., magenta M, as soon as magenta M transfer is completed, the output section 105 supplies the stop instruction to the printer I/F 107. Subsequent transfer of cyan C, yellow Y, and black B is not performed. At this time, the recording paper sheet has already been wound around the transfer drum 716, and development and transfer of magenta M are completed. Therefore, an instruction for separating the paper sheet wound around the transfer drum 716 and a paper discharge instruction are supplied to the printer engine 108.

Figure 2:
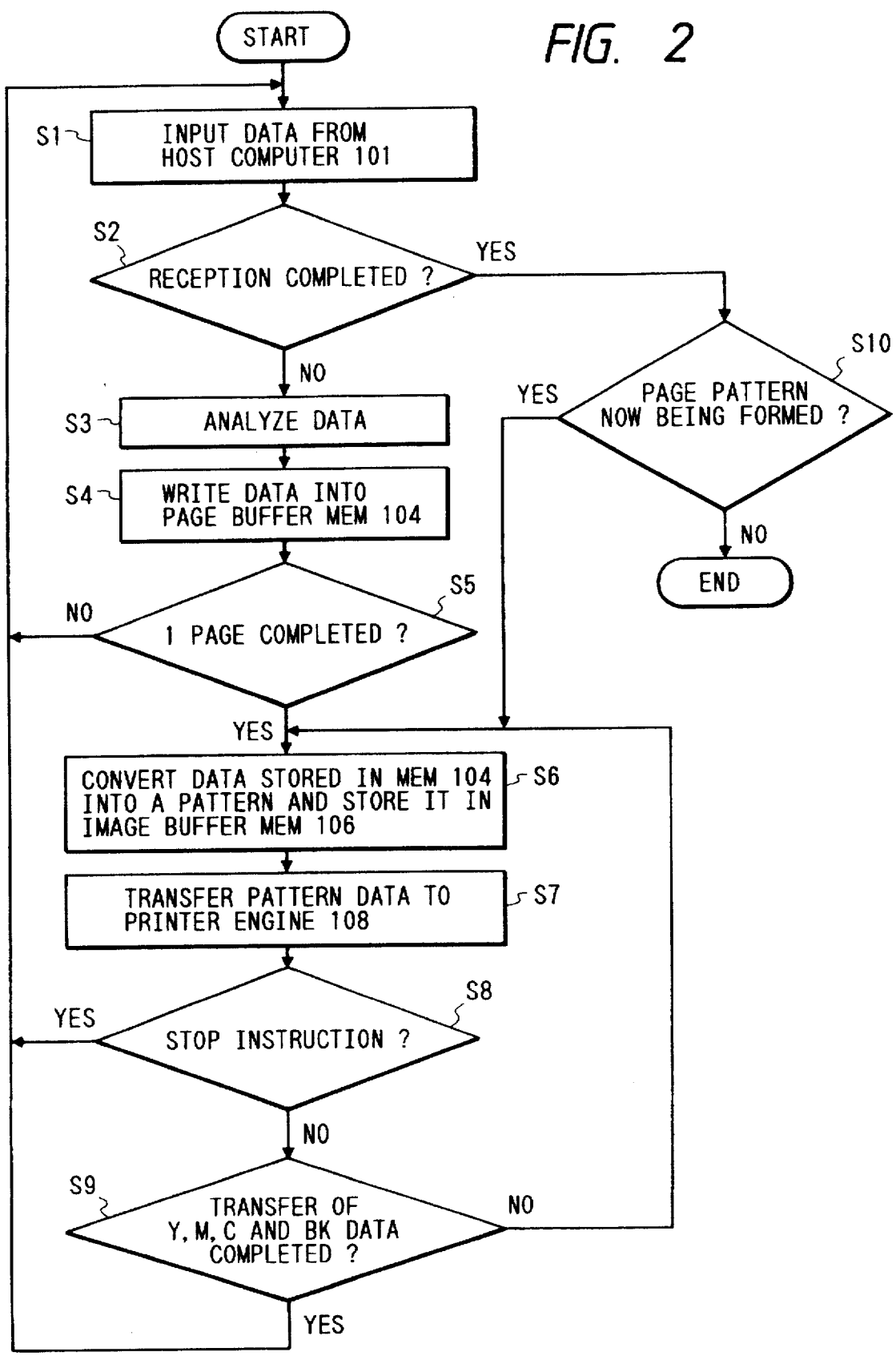
FIG. 2 is a flow chart showing the control sequence of a print output in the printer shown in FIG. 1.

The processing sequence for realizing the above processing will be described with reference to the flow chart in FIG. 2.

In step S1, data is received from the host computer 101 and is stored in the input buffer memory 102. The flow advances to step S2 to cause the data analyzer 103 to determine whether reception is completed. If NO in step S2, the flow advances to step S3 to perform data analysis processing. The flow advances to step S4 to write the analyzed printing data in the page buffer memory 104. It is determined in step S5 whether one-page data is written. If NO in step S5, the flow returns to step S1, and the above processing is repeated.

If the write operation of one-page data is determined in step S5 to be completed, the flow advances to step S6 to convert the printing data in the page buffer memory 104 into basic color component unit patterns and store them in the image buffer memory 106. In step S7, transfer of information of one basic color component in the image buffer memory 106 is instructed to the printer I/F 107, so that the pattern information is supplied to the printer engine 108. After the pattern information of one basic color component is output, the flow advances to step S8 to determine whether a stop instruction is output from the instruction section 109. If the stop instruction is set in an ON state, the image buffer memory 106 is cleared, and the flow returns to step S1 to perform processing of the next page. If the stop instruction is set in an OFF state, the flow advances to step S9 to determine whether transfer of all the basic color components (Y, M, C, and Bk) is completed. If NO in step S9, the flow returns to step S6 to perform processing of the next color. However, if YES in step S9, the flow returns to step S1 to perform processing of the next page.

On the other hand, if reception of the printing data is determined in step S2 to be completed, i.e., when the end of printing data is determined, the flow advances to step S10 to determine one-page printing data is being formed. If YES in step S10, processing from step S6 is performed because the formed data must be printed. If formation of one-page data is completed and no data to be printed is left, processing is ended. Printing processing is repeatedly performed in accordance with the series of operations described above.

According to this embodiment, as described above, if a stop instruction is output from the instruction section during transfer upon the start of one-page transfer, the printing operation is stopped at the end of currently transferred basic color data. Processing can be shifted to that of the next page, thereby shortening the waiting time in stop processing.

[Other Embodiments]

In the above embodiment, only one CPU is used as the CPU 111. However, another CPU may be arranged to perform processing in the output section 105.

In the above embodiment, the printing data source is the host computer 101. However, an external memory device such as a magnetic tape or a disk unit may be used.

The instruction for stopping the printing operation is output from the operation unit 119. However, this instruction may be output from the host computer 101 serving as the data source. In this case, an interrupt signal may be generated every time one data is received from the host computer 101. During interrupt processing, processing for storing the received data in the input buffer and an operation for determining whether the received data represents a printing stop instruction are performed. If the received data represents a printing stop instruction, the stop instruction data is stored in the input buffer 102. At the same time, stop processing is performed. In this stop processing, recording is completed upon completion of the current color component recording. Development processing of the remaining color components is not performed.

Since the stop instruction data is stored in the input buffer 102, data up to the position where the stop instruction data appears is unnecessary, and the unnecessary data is deleted.

In the above embodiment, the color laser beam printer is exemplified as the printing apparatus. However, the present invention is not limited to this. The present invention is applicable to a page printer or a printer having any other printing scheme. In the above embodiment, a plurality of color component images are superposed and recorded as one color image. However, the present invention is also applicable to a case wherein images of the same color are superposed and recorded. Therefore, the present invention is not limited to a color printer.

As described above, according to the present invention, a time required until the printing processing is actually stopped and the next printing processing can be started after the printing stop instruction for a color image is output can be shortened.

According to the present invention, there is also provided a printing apparatus capable of shortening a time required until the printing processing is actually stopped and the next printing processing can be started after the printing stop instruction for a color image is output during superposition recording of a plurality of images can be shortened.

In the above description, when the transfer stop instruction is output to the output section 105 during video signal transfer, the output section 105 does not perform subsequent transfer upon completion of current transfer. The output section 105 outputs the instruction for separating the paper sheet wound around the transfer drum 716 and the paper sheet discharge instruction to the printer engine 108. However, the following embodiment may also be proposed.

The interface in video signal transfer to a printer engine 108 will be described with reference FIG. 4. A /PRINT signal is output from a printer I/F 107 to the printer engine 108 to instruct the start or continuation of a printing operation. A /BD signal is a sync signal in the horizontal scanning direction (main scanning) and represents that the laser beam is located at the start position of horizontal scanning. The printer I/F 107 must output a /VDO signal of one horizontal scanning line in synchronism with the /BD signal. A /TOP signal is a sync signal in the vertical direction (subscanning). The /TOP signal synchronizes the /VDO signal with feeding of the paper sheet in the printer engine 108. The printer I/F 107 outputs the VDO signal of one page to the printer engine 108 in synchronism with the /BD signal after the /TOP signal becomes true. The /VDO signal is a signal representing image information to be printed. The printer engine 108 performs printing with a current developing toner color during the true period of the /VDO signal, but does not perform printing during the false period of the /VDO signal. The printer I/F 107 outputs the /VDO signal corresponding to the paper size in synchronism with the /BD signal (horizontal scanning direction) and the /TOP signal (vertical scanning direction).

A series of operations will be described below. The printer I/F 107 sets the /PRINT signal true to start the printing operation. When the printer engine 108 confirms the true state of the /PRINT signal, the printer engine 108 sets the /TOP signal true. The printer I/F 107 outputs the /VDO signal of one-page image data of the first color component, i.e., magenta M to the printer engine 108 in synchronism with the /BD signal after the /TOP signal becomes true. It is determined whether a transfer stop instruction is output from an instruction section 109 during the transfer of the /VDO signal. If not, the /PRINT signal is kept true, and the /VDO signal of one-page image data of the second color component, i.e., cyan C is output to the printer engine 108 in synchronism with the /BD signal after the next /TOP signal becomes true. The above operations are repeated to transfer the remaining Y and Bk image data, and the images of the plurality of color components are superposed to record a color image.

An operation performed when a transfer stop instruction is output from the instruction section 109 during transfer of the /VDO signal will be described below. When the transfer stop instruction is output from the instruction section 109 upon the start of transfer of the /VDO signal of magenta M, the transfer stop instruction is output to an output section 105 and the printer I/F 107. The printer I/F 107 sets the /PRINT signal false, and the subsequent transfer of the remaining components, i.e., cyan C, yellow Y, and black Bk is not performed. By this operation, upon completion of the /VDO signal of one-page image signal of magenta M, the printer engine 108 does not set the /TOP signal synchronized with the next image data true, and separation and discharge of the paper sheet wound around a transfer drum 716 are performed. Upon completion of the transfer of magenta M, the output section 105 does not transfer data of cyan C, yellow Y, and black Bk.

A processing sequence for realizing the above processing will be described with reference to the flow chart in FIG. 2.

However, this processing is the same as that described above, and a detailed description thereof will be omitted.

What is claimed is:

1. A printing apparatus for superposing and recording images of respective basic color components constituting one page on a recording medium to form a color image in response to printing data received from an external apparatus, comprising:

instruction receiving means for receiving an instruction for stopping printing processing from the external apparatus;

converting means for converting the input printing data into pattern images of the respective color components and storing the pattern images in a conversion memory;

recording means for superposing and recording the pattern images converting by said converting means on the recording medium in units of recording color components;

discriminating means for discriminating whether said instruction means has instructed to stop the printing processing; and control means for controlling said recording means to stop upon completion of the recording if said discriminating means discriminates that said instruction means has instructed to stop the printing process.

2. A method of controlling a printing apparatus for superposing and recording images of respective basic color components constituting one page on a recording medium to form a color image in response to printing data received from an external apparatus, comprising the steps of:

converting the input printing data into pattern images of respective color components and storing the pattern images in corresponding recording color component memories;

performing superposition recording of the pattern images on the recording medium in units of recording color components;

discriminating whether an instruction has been received from the external apparatus for stopping printing processing; and controlling said performing superposition step to stop upon completion of the recording if said discriminating step discriminates that the instruction has been given to stop the printing processing.

3. A printing apparatus for recording a color image in response to printing data received from an external apparatus, comprising:

input means for inputting information instructing to stop data transfer to a printing unit; and means for stopping said input means upon completion of data transfer in a basic color of one page of data if the instructing information is input during data transfer of the basic color of one page of data.

4. A method of operating a printing apparatus for recording a color image in response to printing data received from an external apparatus, comprising the steps of:

inputting information from an input unit instructing stop of data transfer to a printing unit; and stopping said input unit from inputting information upon completion of data transfer in a basic color of one page of data if instructing information is input during data transfer of the basic color of one page data.

5. A computer readable program stored in a memory medium, and method of controlling a printing apparatus for superposing and recording images of respective basic color components constituting one page on a recording medium to form a color image in response to printing data received from an external apparatus, comprising the steps of:

converting the input printing data into pattern images of respective color components and storing the pattern images in corresponding recording color component memories;

performing superposition recording of the pattern images on the recording medium in units of recording color components;

discriminating whether an instruction has been received from the external apparatus for stopping printing processing; and controlling said performing superposition step to stop upon completion of the recording if said discriminating step discriminates that the instruction has been given to stop the printing processing.

6. A computer readable program stored in a memory medium, and method of memory operating a printing apparatus for recording color image in response to printing data received from an external apparatus, comprising the steps of:

inputting information from an input unit instructing stop of data transfer to a printing suit; and stopping said input unit from inputting information upon completion of data transfer in a basic color of one page of data if instructing information is input during data transfer of the basic color of one page data.

* * * * *

UNITED STATES PATENT AND TRADEMARK OFFICE
CERTIFICATE OF CORRECTION

PATENT NO. : 5,729,268
DATED : March 17, 1998
INVENTOR(S) : KOICHIRO AKIMOTO

It is certified that error appears in the above-identified patent and that said Letters Patent is hereby corrected as shown below:

COLUMN 2

Line 62, "signal," should read --signal 800,--.

COLUMN 6

Line 22, "Superposed" should read --superposed--.

Signed and Sealed this

Tenth Day of November 1998

Attest:

BRUCE LEHMAN

Attesting Officer

Commissioner of Patents and Trademarks